(12) United States Patent
Lanfrey (10) Patent No.: US 11,624,032 B2
(45) Date of Patent: Apr. 11, 2023

(54) PROCESS FOR EXTRACTING GASOLINE FROM A GAS CONTAINING CONDENSABLE HYDROCARBONS

(71) Applicant: AXENS, Rueil Malmaison (FR)

(72) Inventor: Pierre-Yves Lanfrey, Rueil Malmaison (FR)

(73) Assignee: AXENS, Rueil Malmaison (FR)

( * ) Notice: Subject to any disclaimer, the term of this patent is extended or adjusted under 35 U.S.C. 154(b) by 144 days.

(21) Appl. No.: 17/147,543

(22) Filed: Jan. 13, 2021

(65) Prior Publication Data

US 2021/0214619 A1   Jul. 15, 2021

(30) Foreign Application Priority Data

Jan. 14, 2020   (FR) ...................................... 2000325

(51) Int. Cl.
  *C10G 5/06*   (2006.01)
  *C10G 7/02*   (2006.01)
  (Continued)

(52) U.S. Cl.
  CPC ................. *C10G 5/06* (2013.01); *C10G 7/02* (2013.01); *C10G 21/08* (2013.01); *C10L 3/10* (2013.01);
  (Continued)

(58) Field of Classification Search
  None
  See application file for complete search history.

(56) References Cited

U.S. PATENT DOCUMENTS 3,868,817 A * 3/1975 Marion .................... F02C 3/20
                                                           60/39.12
5,868,004 A   2/1999 Rojey et al.
(Continued)

FOREIGN PATENT DOCUMENTS

EP        0831142 B1    12/2002
FR        2753720 A1     3/1998
(Continued)

OTHER PUBLICATIONS

Larue J et al: 11 Procede I Ntegre De Traitement Du Gaz Na Turel 11 , Oil & Gas Science & Technology: Revue De L'institut Francais Du Petrole, Editions Technip Paris, FR, vol. 51, No. 5, Sep. 1, 1996 (Sep. 1, 1996), pp. 653-668, XP000684462, ISSN: 1294-4475.
(Continued)

*Primary Examiner* — Tam M Nguyen
(74) *Attorney, Agent, or Firm* — Millen, White, Zelano and Branigan, P.C.; Harry B. Shubin (57) ABSTRACT

The present invention relates to the extraction of gasoline from a gas G, with
(a) a step of extracting gasoline from the gas to be treated comprising methanol GM obtained from step (d),
(b) a step of separating said fluid GL1 partially condensed in step (a), producing
  a first aqueous liquid phase A1,
  a first liquid phase H1 of hydrocarbon(s)
  a gaseous phase G1 obtained from the gas G;
(c) a step of contacting a portion of the gas G to be treated with said first aqueous liquid phase A1, producing
  a second aqueous liquid phase A2,
  a gaseous phase of gas to be treated comprising methanol GM';
(d) a step of mixing said gaseous phase of gas to be treated comprising methanol GM' with the remainder of the gas G to be treated, producing a gas to be treated comprising methanol GM, (Continued)

(e) a step of stabilizing said first liquid phase H1 of hydrocarbon(s).

16 Claims, 2 Drawing Sheets (51) Int. Cl.
 C10G 21/08 (2006.01)
 C10L 3/10 (2006.01)
 F25J 3/06 (2006.01)
(52) U.S. Cl.
 CPC ............... *F25J 3/061* (2013.01); *F25J 3/065* (2013.01); *C10G 2300/1025* (2013.01); *C10G 2300/4025* (2013.01); *C10G 2300/4081* (2013.01); *C10G 2300/805* (2013.01); *C10G 2400/02* (2013.01); *C10G 2400/26* (2013.01); *F25J 2205/02* (2013.01); *F25J 2205/30* (2013.01); *F25J 2205/40* (2013.01); *F25J 2205/50* (2013.01); *F25J 2205/80* (2013.01); *F25J 2210/60* (2013.01); *F25J 2215/04* (2013.01); *F25J 2245/02* (2013.01)

(56) References Cited

U.S. PATENT DOCUMENTS

| 5,868,005 | A | 2/1999 | Larue et al. |
| 6,016,667 | A | 1/2000 | Doerler et al. |
| 6,767,388 | B2 * | 7/2004 | Lecomte ................ F25J 3/0233 |
| | | | 95/193 |
| 2002/0185006 | A1 * | 12/2002 | Lecomte ............. B01D 53/263 |
| | | | 95/231 |
| 2017/0341942 | A1 * | 11/2017 | Harper, Jr. ................ F01K 7/16 |

FOREIGN PATENT DOCUMENTS

FR 2764609 A1 12/1998
FR 2822838 A1 10/2002

OTHER PUBLICATIONS

Search Report in corresponding FR876397 dated Sep. 11, 2020 (pp. 1-2).

* cited by examiner

PROCESS FOR EXTRACTING GASOLINE FROM A GAS CONTAINING CONDENSABLE HYDROCARBONS

TECHNICAL FIELD

The invention relates to a process for extracting gasoline by refrigeration, in the presence of methanol in order to prevent the formation of hydrates, making it possible to at least partially recover the methanol contained in the treated gas. The invention applies in particular to natural gas, in particular comprising C5+compounds (hydrocarbons having carbon chains of at least 5 carbon atoms), and also to other gases which contain condensable hydrocarbons such as refinery gases.

PRIOR ART

If a liquid hydrocarbon phase condenses in the course of the transport and/or handling of these gases, there is the risk of causing incidents such as the occurrence of liquid blockages in the transport or treatment installations designed specifically for gaseous effluents. In order to avoid these problems, gases containing condensable hydrocarbons are generally subjected to a gasoline extraction treatment prior to the transport thereof.

This gasoline extraction process makes it possible to adjust the dew point of the hydrocarbons in order to prevent the condensation of a hydrocarbon fraction during the transport of the gas. The extraction of gasoline can also be effected to recover the liquid fraction of condensed natural gas (NGL) potentially comprising the LPG fraction and the gasoline fraction (C5+), these being able to be profitably exploited.

Various processes for gasoline extraction, in particular using refrigeration, absorption or adsorption means, are described in the prior art. Processes using refrigeration of the gas are the most used. The gas can be refrigerated, either by expansion through a valve or through a turbine, or by an external cooling cycle which makes it possible to lower the temperature of the gas to be treated without reducing its pressure. The presence of water in the gas to be treated leads to the risk of the formation of hydrates. This risk can be avoided by injecting a hydrate formation inhibitor, such as glycol or methanol, into the gas. Methanol is easier to use than glycol because it is less viscous. However, it has a lower vapour pressure than glycols, and it is partially soluble in the condensates. It is therefore present, in non-negligible quantities, in the treated gas, but also in the condensed LPG-type liquid phases obtained, in particular based on propane.

The gasoline extraction processes of this type make it possible in particular to produce, at the end of a step referred to as a stabilization step, a gaseous C1-C2 fraction essentially devoid of methanol at the top of the column and a C3+liquefied natural gas at the bottom of the column. The liquid C3+hydrocarbon fraction is optionally washed with water before or after this stabilization by fractionation. This is because this liquid fraction contains residual methanol due to the high affinity of methanol to the LPGs, in particular propane.

For example, the patent FR 2 764 609 proposes a process for gasoline extraction by refrigeration which uses methanol and which makes it possible to at least partially recover the methanol contained in the treated gas in order to limit the consumption thereof. In this process, the liquid hydrocarbon fraction is sent to a stabilization column in order to separate, on the one hand, the more volatile components (methane and ethane) and, on the other hand, the hydrocarbon phase comprising the constituents having a molar mass higher than that of ethane and exiting at the bottom of the stabilization column. This hydrocarbon phase is sent to a zone for washing with water in order to remove the methanol it contains and then is used to wash the treated gas and to recover the methanol it contains.

The invention thus has the aim of improving the gasoline extraction processes using methanol. It aims in particular to develop a gasoline extraction which makes it possible to produce a C1-C4-rich gaseous phase, and a condensed phase with a reduced content of methanol. It aims in particular, likewise, to reduce the methanol and/or water consumption of the process.

SUMMARY OF THE INVENTION

An object of the invention is firstly a process for extracting gasoline from a gas G containing condensable hydrocarbons, in particular a natural gas containing C5+compounds, said process comprising the following steps:
  (a) a step of extracting gasoline by refrigeration of the gas to be treated comprising methanol GM obtained from step d), producing a partially condensed fluid GL1;
  (b) a step of separating said partially condensed fluid GL1, carried out in a three-phase separator, producing
   a first aqueous liquid phase A1 comprising methanol,
   a first liquid phase H1 of hydrocarbon(s) comprising methanol, and
   a gaseous phase G1 obtained from the gas G;
  (c) a first step of contacting a portion of the gas G to be treated with said first aqueous liquid phase A1 comprising methanol, producing
   a second aqueous liquid phase A2 comprising methanol and depleted in methanol compared to said first aqueous liquid phase A1, and
   a gaseous phase of gas to be treated comprising methanol GM';
  (d) a step of mixing said gaseous phase of gas to be treated comprising methanol GM' with the remainder of the gas G to be treated, with possible adjustment of the methanol content of the mixture, producing a natural gas to be treated comprising methanol GM and intended to be sent to step a);
  (e) a step of stabilizing all or part of said first liquid phase H1 of hydrocarbon(s) comprising methanol, producing
   a stabilized condensate GL2, and
   a C1-C4-rich gaseous phase G2 comprising methanol.

The process according to the invention thus makes it possible to produce a C1-C4-rich gaseous cut comprising methanol and a stabilized (liquid) condensate.

It should be noted that "the portion of the gas G to be treated" of step (c) and "the remainder of the gas G to be treated" of step (d) of the process refer to the fact that there is a common stream of gas to be treated in the process of the invention which are divided into (at least) two streams which will be treated differently: one stream is the "portion of the gas" in question and undergoes the contacting step, the other is "the remainder of the gas" in question.

The process according to the invention operates continuously.

Preferably, step (a) of extracting gasoline by refrigeration of the gas to be treated is carried out in a refrigeration section. Preferably, the pressure and temperature conditions of the step of extracting gasoline by refrigeration of the gas to be treated are chosen so that the compounds having 4 carbon atoms or more which are contained in the gas (in particular the natural gas) to be treated condense in the cold zone. Preferably, this step is carried out at a temperature preferentially of between −60° C. and 0° C. and at a pressure preferentially of between 1.2 MPa and 6.0 MPa.

More preferably, the stabilization step (e) is carried out in a stabilization/distillation column, producing at the bottom the stabilized condensate GL2 and at the top the C1-C4-rich gaseous phase G2 comprising methanol.

Generally, with the process according to the invention, the stabilized condensate GL2 produced in step (e) contains a residual methanol content of less than or equal to 20 ppm by weight, preferably of less than or equal to 10 ppm by weight.

Preferably, the process according to the invention also comprises an additional treatment of the C1-C4-rich gaseous phase G2 comprising methanol and obtained in the stabilization step (e), with the aim of extracting therefrom at least a portion of the methanol in said gaseous phase G2.

The invention, with this additional treatment, makes it possible to produce a C1-C4-rich gaseous cut with a reduced content of methanol, that is to say depleted in methanol in comparison with said first C1-C4-rich gaseous cut comprising methanol. In addition, this additional treatment makes it possible to recover the methanol in this cut, and therefore to reduce the amount of methanol consumed by the process. This thus reduces the amount of methanol added as supplement in the course of the process and the costs that are associated with this, this also simplifies the logistics associated with the transport and the storage thereof. This depletion in methanol due to this additional treatment can extend to a methanol concentration falling by 99%.

According to one embodiment, this additional treatment of the C1-C4-rich gaseous phase G2 comprising methanol and obtained in stabilization step (e) comprises the following steps:

(f) a step of washing, with water, said 01-C4-rich gaseous phase G2 comprising methanol with the aid of a third aqueous liquid phase A3, in particular carried out by gas-liquid contacting, producing
  a second C1-C4-rich gaseous phase G3 with a reduced content of methanol, and
  a fourth aqueous phase A4 enriched in methanol in comparison to said third aqueous liquid phase A3;
(g) a second step of contacting a portion of the gas G to be treated with said fourth aqueous phase A4 enriched in methanol, in particular carried out in at least one stripper, producing
  a fifth aqueous phase A5 depleted in methanol compared to said fourth aqueous phase A4 enriched in methanol, and
  a second phase of gas to be treated comprising methanol GM", which is preferably mixed with said first phase of gas to be treated comprising methanol GM' obtained from step (c).

Preferably, the first contacting step (c), and possibly the second contacting step (g), when this is provided, is carried out in at least one stripper-type contacting column or by pervaporation through a membrane which is selective with respect to methanol.

According to a preferred embodiment of step (f), all or part of the third aqueous liquid phase A3 originates from at least one other step of the gasoline extraction process. In this way, the amount of water required/consumed in the washing steps of the process is limited.

This third aqueous liquid phase A3 preferably comprises all or part of the second aqueous liquid phase A2 comprising methanol and depleted in methanol and obtained in step (c) and/or all or part of the fifth aqueous phase A5 depleted in methanol and obtained in step (g).

In this way, the process according to the invention is operated in a closed loop as regards the water.

Advantageously, the C1-C4-rich gaseous phase G2 comprising methanol and obtained from step (e) and/or, possibly, the second C1-C4-rich gaseous phase G3 with a reduced content of methanol obtained from step (f) can be profitably exploited directly, either as low-pressure combustible gas or as high-pressure combustible gas after compression, alone or after mixing with another gas, in order to be mixed with the export gas (which may in particular comprise the gas G1, if appropriate after compression.

It can also be recycled upstream of the gas treatment installation with the wet gas. As is known, wet gas is a crude, generally three-phase, fluid originating from oil wells, which arrives at the inlet of the gas treatment plant: the gas G treated in accordance with the invention is generally the gaseous part of this fluid which might previously have undergone a pretreatment such as a deacidification before being treated in accordance with the invention).

This 01-C4-rich gaseous phase G2 comprising methanol and obtained from step (e) may also be recycled in the process of the invention, upstream and/or downstream of step (c) of contacting a portion of the gas G to be treated.

In a first variant, the process according to the invention comprises the following additional step:

(h) a step of separating the first liquid phase H1 of hydrocarbon(s) obtained from step (b), preferably carried out in a separating drum, to produce
  a second liquid phase H2 of hydrocarbon(s) comprising methanol, which is preferably sent to stabilization step (e), and
  a third gaseous phase G4 comprising C1-C4 compounds and methanol.

It is understood in this step that, as is known to the person skilled in the art, the liquid phase H1 may effectively be separated into a liquid phase H2 and a gaseous phase G4 by means, in particular, of a modification of pressure and/or of temperature of the reheating, expansion type such that the liquid phase H1 can be likened to a two-phase fluid when it is effectively separated in a separating drum-type device.

Preferably, this third gaseous phase G4 comprising C1-C4 compounds and methanol is sent to the washing step (f) of washing with water, as a mixture with the C1-C4-rich gaseous phase G2 comprising methanol and obtained from stabilization step (e).

This step (h) makes it possible to reduce the size of the stabilization column used in stabilization step (e), since the amount of gas contained in the feedstock of this column is reduced.

Preferably, the process according to the invention comprises the following additional step after step (h):

(i) a step of washing, with water, the second liquid phase H2 of hydrocarbon(s) comprising methanol with the aid of a sixth aqueous liquid phase A6, in particular carried out by gas-liquid contacting, producing
  a third liquid phase H3 of hydrocarbon(s) depleted in methanol in comparison to the second liquid phase H2 of hydrocarbon(s), and
  a seventh aqueous phase A7 enriched in methanol in comparison to the sixth aqueous phase A6.

Advantageously, the sixth aqueous phase A6 comprises all or part of the second aqueous phase A2 obtained from the contacting step (c) and/or all or part of the fourth aqueous phase A4 comprising methanol and obtained from step (f) of washing with water.

This optional step (i) makes it possible to reduce the amount of methanol in the third liquid phase H3 of hydrocarbon(s) which is then sent to the stabilization step (e) after this step (i). It should be noted that alternatively, however, the third liquid phase H3 of hydrocarbon(s) may be sent directly to the stabilization step (e) without passing via this optional step (i).

In a second variant, the process according to the invention comprises the following additional steps:

(j) a step of mixing the first liquid phase H1 of hydrocarbon(s) comprising methanol and obtained from step (b) with an eighth aqueous phase A8, which preferably comprises all or part of the second aqueous phase A2 obtained from step (c) and/or all or part of the fourth aqueous phase A4 comprising methanol and obtained from step (f);

(h') a step of separating the mixture obtained from step (j), in particular carried out in a three-phase separating drum, to produce:
- a fourth liquid phase H4 of hydrocarbon(s) comprising methanol which is sent to stabilization step (e);
- a fourth gaseous phase G5 comprising C1-C4 compounds and methanol;
- a ninth aqueous phase A9 enriched in methanol compared to the eighth aqueous phase A8.

This variant makes it possible to reduce the amount of methanol both in the fourth liquid hydrocarbon phase H4 comprising methanol which is sent to the stabilization step (e) and in the fourth gaseous phase G5 comprising C1-C4 compounds and methanol. Specifically, the methanol content of the fourth gaseous phase G5 comprising C1-C4 compounds and methanol is lower than that of the third gaseous phase G4 comprising C1-C4 compounds and methanol obtained in step (h). This reduction in the methanol content can range up to 30% less methanol (expressed by weight of methanol).

Preferably, the fourth gaseous phase G5 comprising C1-C4 compounds and methanol is sent to step (f) of washing with water, as a mixture with the C1-C4-rich gaseous phase G2 comprising methanol and obtained from stabilization step (e).

In the variants comprising steps h) and i) or steps j) and h'), the process can comprise the following additional step:

(k) a step of contacting a portion of the gas G to be treated with the seventh aqueous phase A7 and/or the ninth aqueous phase A9, in particular carried out in at least one stripper, to produce:
- a tenth aqueous phase A10 and/or an eleventh aqueous phase A11 depleted in methanol in comparison with the seventh aqueous phase A7 and/or the ninth aqueous phase A9, and
- a second phase of gas G' to be treated comprising methanol.

This step is combinable with the other contacting steps of the process, notably steps (c) and (g). The term "combinable" means in particular that it is possible for example to mix at least two aqueous phases enriched in methanol in order to treat them in a single stripper. It is also possible to introduce at least two aqueous phases separately, at different levels, into a single stripper, or else to use several strippers, each being fed by one or more aqueous phases.

In the two variants described above, preferably, the third aqueous liquid phase A3 used in the washing step (f) is composed in part or completely of the second aqueous phase A2 depleted in methanol and/or of the tenth aqueous phase A10 depleted in methanol and/or of the eleventh aqueous phase A11 depleted in methanol.

In this way, the process according to the invention is operated in a closed loop as concerns the water.

Preferably, the natural gas to be treated in the process according to the invention is chosen from a natural gas, a refinery gas, or any other gas containing a C1 to C4 fraction and C5+compounds.

LIST OF FIGURES

All of the figures are schematic. The same references retain the same meaning from one figure to another.

DESCRIPTION OF THE EMBODIMENTS

Definitions and Conventions

In the present text, the terms "enriched" and "depleted" in one or more compounds in an effluent/stream exiting a step should be understood relative to the concentration of said compound(s) in an entering effluent/stream. Thus an exiting stream depleted in methanol means that the exiting stream has a lower methanol concentration than the methanol concentration of the entering stream. In the same way, an exiting stream enriched in methanol contains a higher methanol concentration than the methanol concentration of the entering stream.

In the present text, and more specifically regarding the aqueous phase(s) "depleted in methanol", the term "depleted" is understood as meaning that the aqueous phase in question has a methanol content, expressed as percentage by weight, which is reduced by at least 50%, in particular by at least 80%, compared to the aqueous phase from which it is obtained.

In the present text, the term "aqueous phase enriched in methanol" is understood to mean that the phase in question has a methanol content, expressed as percentage by weight, which is increased by at least 30% compared to the aqueous phase from which it is obtained, in particular by at least 50%.

The aqueous phase may undergo a series of successive enrichments in methanol, in particular a series of washes, preferably with water, for example according to step (f), or for example according to step (i) or (j) and then step (f), or for example according to step (m) followed by step (f). The person skilled in the art will know how to adjust the methanol enrichment level of the aqueous phase considered after each of these successive washes, in order to arrive at a high final methanol recovery rate of at least 85%, preferably of at least 90% and even of at least 95% of methanol by weight.

In the present text, the term "01-C4-rich gaseous phase" means a phase comprising at least 70 mol % of C1-C4 compounds, in particular at least 80 mol % and even at least 90 mol % of C1-C4 compounds.

In the present text, the term "the LPG fraction" means a fraction essentially comprising the hydrocarbon compounds propane (C3) and butane (C4).

In the present text, the term "stabilized condensate" means a liquid cut which is stable at ambient pressure and temperature, predominantly composed of C5+compounds and a little butane.

In the present text, the term "01-C4-rich" phase means a phase having a content of C1-C4 compounds, that is to say comprising compounds having from 1 to 4 carbon atoms, of greater than or equal to 85 mol % or % by volume, preferably greater than or equal to 95 mol % or % by volume.

In the present text, the term "phase" or the term "stream" are used without distinction to denote a liquid or gaseous fluid.

In the present text, the term "aqueous phase" or "aqueous stream" denote water in liquid form, possibly loaded (with impurities) when the water serves for washing another fluid.

The description and the examples which follow relate to the treatment of natural gas.

Step (a) of Extracting Gasoline by Refrigeration of the Natural Gas:

The process according to the invention comprises a step (a) of extracting gasoline by refrigeration of the natural gas to be treated obtained from step (d), carried out in a refrigeration section, producing a partially condensed fluid.

Advantageously, this step is carried out under pressure and temperature conditions which prevent the formation of ice or of hydrate. These conditions also make it possible to condense the hydrocarbons comprising from 1 to 5 carbon atoms and more, and in particular a majority of the compounds having 5 carbon atoms and more, denoted "C5+ compounds", contained in the natural gas to be treated.

Preferably, this step is carried out in a refrigeration section operating at a temperature of between −60° C. and 0° C. and at a pressure of between 1.2 MPa and 6.0 MPa, producing a partially condensed fluid.

Preferably, the pressure and temperature conditions of the step of extracting gasoline by refrigeration of the natural gas to be treated are chosen so that the compounds having 4 carbon atoms or more which are contained in the natural gas to be treated condense in the cold zone.

Step (b) of Separating Said Partially Condensed Fluid:

The process according to the invention comprises a step (b) of separating said partially condensed fluid, carried out in a three-phase separator, producing an aqueous phase made up of a first aqueous phase comprising methanol, a hydrocarbon phase made up of a first liquid hydrocarbon phase and a gaseous phase made up of a treated natural gas.

Advantageously, this step is carried out under pressure and temperature conditions which prevent the formation of ice or of hydrate. Advantageously, this step is carried out under pressure and temperature conditions within the same ranges as that of the gasoline extraction step.

Typically, the treated natural gas has a methanol content of the order of from 50 to 300 ppm by volume.

Typically, the first aqueous phase comprising methanol contains between 20% and 85% methanol by weight.

Step (c) of First Contacting of a Portion of the Natural Gas to be Treated with the First Aqueous Phase Comprising Methanol.

The process according to the invention comprises a step (c) of first contacting of a portion of the natural gas to be treated with the first aqueous phase comprising methanol, carried out in at least one stripper, producing a second aqueous phase comprising methanol and depleted in methanol compared to the first aqueous phase and a first phase of natural gas to be treated comprising methanol.

Advantageously, the portion of the natural gas to be treated sent to step (c) is of the order of 30% to 70% by weight of the total amount of natural gas to be treated.

The person skilled in the art can choose the optimal conditions (pressure, temperature, number of theoretical stages, ratio, flow rates) during this step so that the methanol contained in the first aqueous phase comprising methanol is transferred into the natural gas to be treated. Said stripper advantageously comprises packing.

The person skilled in the art can choose the optimal conditions during this step to obtain a second aqueous phase with a methanol content of less than or equal to 1% by weight, preferentially less than or equal to 2000 ppm by weight, more preferentially less than or equal to 500 ppm by weight.

The temperature during the first contacting step (c) is advantageously between 15 and 60° C., preferably between 35 and 55° C., more preferably between 35 and 45° C., and the pressure is advantageously between 1 and 10 MPa.

This step is preferentially carried out in a gas-liquid washing column with a number of theoretical stages of less than or equal to seven theoretical stages, preferentially of between four to six theoretical stages.

Step (d) of Mixing the Phase of Natural Gas to be Treated Comprising Methanol with the Remainder of the Natural Gas to be Treated and Adjusting the Methanol Content of the Mixture The process according to the invention comprises a step (d) of mixing the first phase of natural gas to be treated comprising methanol with the remainder of the natural gas to be treated, followed by or preceded by or incorporating an adjustment of the methanol content of the mixture. The process according to the invention makes it possible to produce a natural gas to be treated comprising methanol sent to the gasoline extraction step (a).

The absence of formation of ice or hydrates in the gasoline extraction process is assured by the presence of methanol in sufficient quantity. The large majority of this methanol is already present in the natural gas to be treated obtained from step (c), but a possible additional supplement makes it possible to maintain the necessary methanol content in the system and compensates for losses.

The adjustment of the methanol content of the mixture is performed with a phase of methanol preferentially originating from a storage reservoir.

Stabilization Step (e)

The step e of stabilizing all or part of the first liquid hydrocarbon phase comprising methanol is carried out in a stabilization column and produces at the bottom stabilized condensate and at the top a first C1-C4-rich gaseous cut comprising methanol. Said stabilized condensate has a residual methanol content of less than or equal to 20 ppm by weight, preferably less than or equal to 10 ppm by weight.

As seen above, the pressure and temperature conditions of the step (a) of extracting gasoline by refrigeration of the natural gas to be treated are chosen so that the compounds having 4 carbon atoms or more which are contained in the natural gas to be treated condense in the cold zone. This leads to a greatly reduced residual methanol content in the treated natural gas and a non-negligible methanol content in the aqueous phase and the liquid hydrocarbon phase which are produced during this step. The stabilization step (e) treats all or part of said first liquid hydrocarbon phase comprising methanol. Said methanol becomes concentrated in the first gaseous cut/phase made up of the C1 to C4 cuts obtained from the stabilization step (e). The methanol content in this cut is preferentially between 0.3 mol % and 3 mol %, and more preferentially between 0.5 mol % and 2 mol %.

This first C1-C4-rich gaseous cut/phase comprising methanol is generally available at reduced pressure, and may have various destinations, in particular:
1) be sent as low-pressure combustible gas;
2) be compressed, alone or after mixing with another gas, to be:
2a) mixed with treated natural gas;
2b) recycled upstream of the gas treatment unit with the wet gas (defined above) to be treated;
2c) recycled upstream of the stripping step as a mixture with a portion of the natural gas to be treated;
2d) recycled downstream of the step of contacting by stripping (c) as a mixture with the natural gas to be treated.

For options 1, 2a and 2b, the methanol present in said first C1-C4-rich gaseous cut obtained from the stabilization step (e) is lost and must be compensated for by a supplement.

For option 2c, the high methanol content present in the stabilization gas contaminates the natural gas to be treated, which feeds the stripping step and is initially devoid of methanol, and degrades the performance of the contacting step.

For option 2d, the methanol contained in the first gaseous cut obtained from the stabilization step is to a large part recycled naturally into the cold process in a very efficient manner. Nevertheless, a portion of the methanol with still be lost or not directly available in the recycled gas during the compression step which includes cooling.

Step (f) of Washing, with Water, Said First C1-C4-Rich Gaseous Cut Comprising Methanol and Obtained from the Stabilization Step To reduce the methanol lost in the C1-C4-rich gaseous cut, the process according to the invention preferably comprises the additional steps (f) of washing said 01-C4-rich gaseous cut with water and (g) of a second step of contacting a portion of the natural gas to be treated.

The step (f) of washing, with water, said first C1-C4-rich gaseous cut comprising methanol and obtained from the stabilization step is optional. It is preferably carried out by gas-liquid contacting with the aid of a third aqueous phase, producing a second C1-C4-rich gaseous cut with a reduced content of methanol and a fourth aqueous phase enriched in methanol in comparison with the third aqueous phase. This step makes it possible to extract the methanol from said first C1-C4-rich gaseous cut.

Typically, the first C1-C4-rich gaseous cut comprising methanol and obtained from the stabilization step has a methanol content of the order of from 3000 ppm by volume to 20 000 ppm by volume depending on the LPG content of said cut.

According to a preferred embodiment of step (f), the third aqueous washing phase has a reduced content of methanol. This may in its entirety or in part be one or more of the aqueous phases depleted in methanol obtained from the contacting step(s). Typically, the methanol content of the third aqueous phase is preferentially less than or equal to 1% by weight, more preferentially less than or equal to 2000 ppm by weight, more preferentially still less than or equal to 500 ppm by weight.

In this step, the choice of operating conditions, in particular the temperature and the flow rate of the third aqueous phase, has an impact on the methanol content of the second C1-C4-rich gaseous cut.

The person skilled in the art can choose the optimal conditions during this step to obtain a methanol content in the second C1-C4-rich gaseous cut of less than 500 ppm by volume, preferentially less than 300 ppm by volume, more preferentially less than 100 ppm by volume.

The fourth aqueous phase has a methanol content of typically greater than or equal to 2% by weight, more preferentially of greater than or equal to 5% by weight.

The temperature during the washing step (f) is advantageously between 5 and 60° C., preferably between 15 and 50° C., more preferably between 20 and 40° C., and the pressure is advantageously between 0.1 and 2.0 MPa, preferentially between 0.3 and 1.5 MPa.

The ratio between the mass flow rate of the third aqueous phase and the mass flow rate of methanol present in the first hydrocarbon phase comprising methanol is advantageously between 3 and 20, preferably between 5 and 15.

At the end of step (f), the second C1-C4-rich gaseous cut is able to have several destinations. It may in particular:
be used as combustible gas;
be compressed, alone or after mixing with another gas, to then be:
sent to the outlet of step c), or possibly after step d), to be mixed with the natural gas to be treated comprising methanol, at the outlet of the stripper(s);
sent as a mixture with the treated natural gas;
sent to a unit which can receive a wet feed gas or with free water.

Thus, step (f) makes it possible to export a gas with a reduced content of methanol which makes it possible to better profitably exploit same, and also to reduce the loss of methanol of the process. The term "with a reduced content" of methanol means a gas which contains at the most 300 ppm by volume of methanol.

According to a first embodiment, the step (f) of washing with water is carried out in a gas-liquid washing column.

In this embodiment, the gas-liquid washing column has a number of theoretical stages of less than or equal to five theoretical stages, preferentially of between two to four theoretical stages. Preferably in this embodiment, the gas-liquid washing column can be implemented with a gas-liquid absorption column, which makes it possible to obtain an effective washing with a small number of theoretical stages.

According to a second alternative embodiment of the process according to the invention, the step (f) of washing with water is carried out with the aid of at least one mixer followed by a separator, or else a succession of mixer(s)-settler(s). The mixer makes it possible to contact all or part of the first C1-C4-rich gaseous cut comprising methanol with all or part of the third aqueous phase. The separator makes it possible to separate the mixed phase to produce a second C1-C4-rich gaseous cut depleted in methanol compared to the first, and a fourth aqueous phase enriched in methanol in comparison with the third aqueous phase.

Preferably in this embodiment, the mixer is of the static mixer type.

Preferably in this embodiment, the separator is a piece of equipment common to that used in another step of the process, for example, a knock-out drum of a compressor used to compress the C1-C4-rich gaseous cut or the reflux drum of the stabilization column.

Step (g): Second Step of Contacting a Portion of the Natural Gas to be Treated with the Fourth Aqueous Liquid Phase The second step of contacting (g) a portion of the natural gas to be treated with the fourth aqueous phase is carried out in at least one stripper producing a fifth aqueous phase depleted in methanol in comparison with the fourth aqueous phase, and a second phase of natural gas to be treated comprising methanol, which is, preferably, mixed with the first phase of natural gas to be treated comprising methanol obtained from step (c) and later sent to the gasoline extraction step.

The fifth aqueous phase can be used in step (f) or in the other washing steps.

The contacting step (g) enables the recovery of the methanol of the fourth aqueous phase. It makes it possible to recycle the methanol extracted from the first C1-C4-rich gaseous cut directly into the natural gas to be treated, and to reduce the consumption of methanol.

This second contacting step (g) can be carried out in a manner combined with the first contacting step (c). Specifically, it is possible to perform these two steps in a single stripper, or in two strippers, in which stripper(s) a portion of the natural gas to be treated is contacted successively with the first aqueous phase and the fourth aqueous phase, in any order.

The person skilled in the art can choose the optimal conditions during this step to obtain a fifth aqueous phase with a methanol content of less than or equal to 1% by weight, preferentially less than or equal to 2000 ppm by weight, more preferentially less than or equal to 500 ppm by weight.

Step (g) may advantageously be carried out in a similar manner and under the same conditions as the contacting step (c).

Advantageously, the portion of the natural gas to be treated sent to step (g) is of the order of 30% to 70% by weight of the total amount of natural gas to be treated.

Separation Stage (h)

The process according to the invention advantageously comprises an additional step (h) of separating the first liquid hydrocarbon phase comprising methanol and obtained from step (b), preferably carried out in a separating drum, to produce a hydrocarbon phase made up of a second liquid hydrocarbon phase comprising methanol and a gaseous phase made up of a third gaseous phase comprising C1-C4 compounds and methanol. The second liquid hydrocarbon phase comprising methanol is sent to the stabilization step (e) directly, or after an optional step (i) of washing with water.

Step (h) makes it possible to reduce the size of the stabilization column.

The temperature during this step is advantageously between 5 and 25° C., preferably between 10 and 20° C., and the pressure is advantageously between 0.5 and 2.5 MPa, preferentially between 1.0 and 2.0 MPa. This makes it possible to reduce the C1-C3 content in the second liquid hydrocarbon phase and to reduce the size of the stabilization column.

This separation step can also be carried out in a demethanizer- or de-ethanizer-type column, or in a succession of separating drums.

Step (i) of Washing with Water

When the process according to the invention comprises a step (h), the second liquid hydrocarbon phase produced in this step is advantageously subjected to a step (i) of washing with water with the aid of a sixth aqueous phase.

The step (i) of washing with water is preferably carried out in a liquid-liquid countercurrent contacting column, with the aid of a sixth aqueous phase comprising all or part of the second aqueous phase comprising methanol or all or part of the fourth aqueous phase comprising methanol and obtained from step (f).

This washing step (i) produces a third liquid hydrocarbon phase depleted in methanol compared to the second liquid hydrocarbon phase and a seventh aqueous phase enriched in methanol compared to the sixth aqueous phase. This variant makes it possible to reduce the content of methanol in the phase feeding the stabilization column.

The recovery of the methanol contained in the liquid hydrocarbon fraction can be effected by techniques other than washing with water, for example by pervaporation through a membrane which is selective for methanol. The recovery of methanol can also be effected by adsorption of methanol on a suitable adsorbent. According to this configuration, two beds of adsorbent operate simultaneously, the first adsorbing methanol by contact with the liquid hydrocarbon fraction circulating there, the second being regenerated. The regeneration is achieved by flushing the saturated bed with a regeneration gas which adsorbs the methanol.

Step (j): Second Step of Washing the First Hydrocarbon Phase Comprising Methanol In a second variant of the process of the invention, as an alternative to steps (h) and (i), the process according to the invention advantageously comprises a step (j) of mixing the first liquid hydrocarbon phase comprising methanol obtained from step (c) with an eighth aqueous phase. The eighth aqueous phase preferentially comprises all or part of the second aqueous phase, or all or part of the fourth aqueous phase comprising methanol and obtained from step (f). This step makes it possible to transfer a portion of the methanol contained in said first hydrocarbon phase comprising methanol into the fifth aqueous phase. In this case, step (j) is advantageously followed by a separation step (h') instead of and in place of step (h).

The ratio between the mass flow rate of the eighth aqueous phase and the mass flow rate of methanol present in the first liquid hydrocarbon phase is advantageously between 3 and 20, preferably between 5 and 15.

Advantageously, the mixing is carried out with the aid of a mixing device of the static mixer or spray nozzle type, or any other device which improves the quality of the mixing between the two phases.

Advantageously, this step is carried out under suitable pressure and temperature conditions which prevent the formation of ice or of hydrate.

Stage (h') of Separating the Mixture Obtained from Step (j):

When the process according to the invention comprises a step (j), the separation step (h') which follows is slightly different from step (h). In this case, the separation step (h') is a three-phase separation of the mixture obtained from step (j), and is preferably carried out in a three-phase separating drum to produce:

a fourth liquid hydrocarbon phase comprising methanol which is sent to stabilization step (e), a gaseous phase made up of a fourth gaseous phase comprising C1-C4 compounds and methanol, and an aqueous phase made up of a ninth aqueous phase enriched in methanol compared to the eighth aqueous phase.

The ninth aqueous phase can be sent to the second contacting step (g).

This variant makes it possible to produce a fourth gaseous phase comprising a reduced content of methanol. Typically, the gaseous phase comprising C1-C4 compounds which is produced in step (h') has a content of methanol of typically between 500 and 6000 ppm by volume.

These steps make it possible to reduce the amount of washing water required during the later washing step (f).

Preferably, in the variant of the process comprising steps (i) and (h'), the fourth gaseous phase comprising C1-C4 compounds and methanol is sent to step (f) of washing with water as a mixture with said first gaseous cut comprising C1-C4 compounds and obtained from the stabilization step.

Advantageously, this step is carried out under suitable pressure and temperature conditions which prevent the formation of ice or of hydrate.

The temperature during this step is advantageously between 5 and 25° C., preferably between 10 and 20° C., and the pressure is advantageously between 0.5 and 2.5 MPa, preferentially between 1.0 and 2.0 MPa. This makes it possible to prevent the formation of ice or hydrate.

Step (k): Third Step of Contacting a Portion of the Natural Gas to be Treated

In the variants of the process comprising the steps (h) and (i) or the steps (j) and (h'), the process can comprise a step (k) of contacting a portion of the natural gas to be treated with the seventh aqueous phase or the ninth aqueous phase comprising methanol, carried out in at least one stripper, to produce a tenth aqueous phase and/or an eleventh aqueous phase depleted in methanol compared to the seventh aqueous phase and/or the ninth aqueous phase, and a second phase of natural gas to be treated comprising methanol. This step is combinable with the other contacting steps, notably (c) and (g). Specifically, it is possible for example to mix at least two aqueous phases enriched in methanol in order to treat them in a single stripper. It is also possible to introduce at least two aqueous phases separately, at different levels, into a single stripper, or else to use several strippers, each being fed by one or more aqueous phases.

In these two variants, the second, methanol-poor, aqueous phase used in the washing step (f) is preferably composed in part or completely of the sixth and/or seventh methanol-poor aqueous phase. In this way, the process according to the invention is operated in a closed loop.

Step (k) is carried out in a similar manner and under the same conditions as the second contacting step (g).

In the two variants, said third, methanol-poor aqueous phase used in the washing step (f) is preferably composed in part or completely of the second aqueous phase depleted in methanol and/or of the tenth aqueous phase depleted in methanol and/or of the eleventh aqueous phase depleted in methanol. In this way, the process according to the invention is operated in a closed loop.

Washing Step (m) Integrated with the Stabilization Step (e)

In another preferred implementation of the process according to the invention, the step (f) of washing with water may be replaced by, or combined with, a step (m) of washing the vapour fraction obtained directly from the top of the stabilization column.

Washing step (m) is carried out, for example, by mixing the vapour fraction obtained from the top of the stabilization column, before or after cooling this fraction, with a twelfth aqueous phase, in order to produce a thirteenth aqueous phase enriched in methanol, compared to the twelfth aqueous phase, and a C1-C4-rich vapour fraction with a reduced content of methanol.

Washing step (m) is integrated into the stabilization step (e). This makes it possible to reduce the amount of methanol contained in said 01-C4-rich vapour fraction obtained from the top of the stabilization column. In this case, the reflux drum of the stabilization column is a three-phase separating drum which makes it possible to receive and to discharge the aqueous phase comprising methanol.

The twelfth aqueous phase preferentially comprises or all or part of the fourth aqueous phase obtained from step (f). In this way, the process according to the invention is operated in a closed loop.

Advantageously, the mixing is carried out with the aid of a mixing device of static mixer type, or of a dispersing nozzle or of any other device which improves the quality of the mixing between a gaseous phase and a liquid phase.

Advantageously, this step is carried out under suitable pressure and temperature conditions which prevent the formation of ice or of hydrate.

Other, different arrangements may be adopted without departing from the scope of the present invention.

DESCRIPTION OF THE FIGURES

Figure 1:
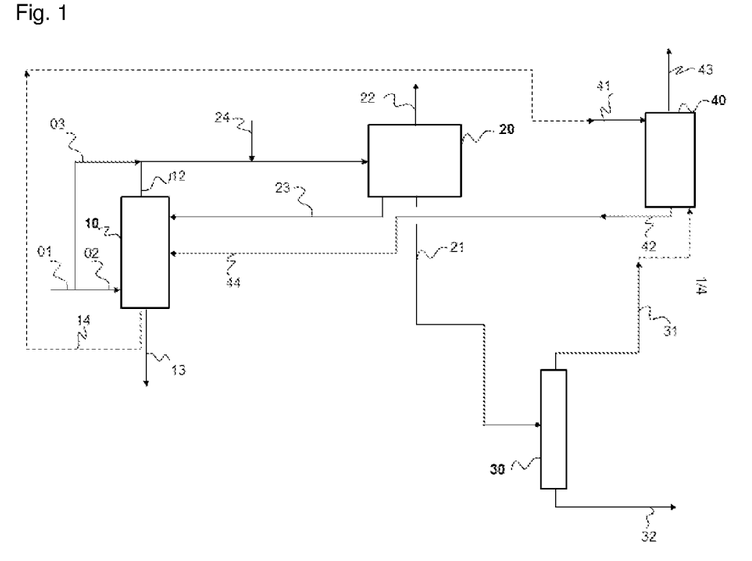
FIG. 1 illustrates the implementation of the process according to a first embodiment of the invention.

FIG. 1 illustrates the implementation of the process according to a first embodiment of the invention. The natural gas to be treated 22 arrives via the conduit 01. The stream is divided into two fractions 02 and 03. The fraction of natural gas to be treated 02 is subjected to a contacting step carried out in a column 10 comprising at least one contact zone in which fraction 02 is contacted with an aqueous, methanol-laden phase 23 obtained from the gasoline extraction step 20 described below. During this contacting step, the gas to be treated 02 becomes loaded with methanol. The aqueous phase freed from the major portion of the methanol it contained is discharged via the stream 13 and is preferentially recycled into the process, for example into the washing step 40 described below.

At the end of the contacting step 10, the stream of gas to be treated comprising methanol 12 is mixed with the stream of gas to be treated 03. Then, the content of methanol in the stream obtained is adjusted via the stream 24 and this stream is sent to the gasoline extraction step 20. During this step, the stream of gas to be treated comprising methanol is cooled typically to within a temperature range of from −60° C. to 0° C. at a pressure of from 1.2 MPa to 6.0 MPa. This cooling induces the condensation of water and of a liquid hydrocarbon phase comprising hydrocarbons, and in particular within the context of the invention hydrocarbons having 5 carbon atoms or more (C5+) initially contained in the gas to be treated. The refrigeration can be performed by an expansion of the gas through a valve or through a turbine, by an external cold cycle or by any other solution known to the person skilled in the art. The gas and the condensed liquid phases are separated in a three-phase separator (not shown). The treated natural gas is low in heavy hydrocarbons and contains a residual amount of methanol which varies depending on the operating conditions and the configuration of the unit 20. It is exported out of the unit. The aqueous phase comprising methanol 23 is sent to the contacting step described above. The liquid stream of hydrocarbons 21 contains an amount of methanol which varies depending on the operating conditions and the configuration of the unit 20.

The liquid stream of hydrocarbons 21 is sent directly to a stabilization step carried out in a stabilization column 30. In this column, which is generally equipped with a reboiling zone at the bottom and with a condensation zone at the top, the lighter constituents comprising the major part of the hydrocarbons having 1 to 4 carbon atoms (denoted C1-C4) are separated from the liquid phase 32 which is made up essentially of C5+compounds with a very low content of methanol. This liquid hydrocarbon phase 32 (stabilized condensates) is generally sent out of the process. The gaseous fraction obtained from the stabilization step 31 can be used for example as fuel gas or compressed in order to be recycled upstream of the gasoline extraction step.

In a preferred variant of the process according to the invention, the gaseous fraction obtained from the stabilization step 31 is sent to a step f of washing with water which is carried out in a liquid-liquid column 40 with the aid of an aqueous stream 41. The aqueous stream 42 obtained from the washing column 40 is enriched in methanol in comparison to the aqueous stream 41. Optionally, this stream 41 comes from the stream 14 originating from the column 10. This stream 41 is then sent to the contacting step 10 via the conduit 44 in order to be regenerated by transferring the methanol into the fraction of natural gas to be treated 02.

The stage of washing the stream 31 thus makes it possible to produce a gaseous stream 43 rich in compounds having 1 to 4 carbon atoms but depleted in methanol compared to the stream 31.

Figure 2:
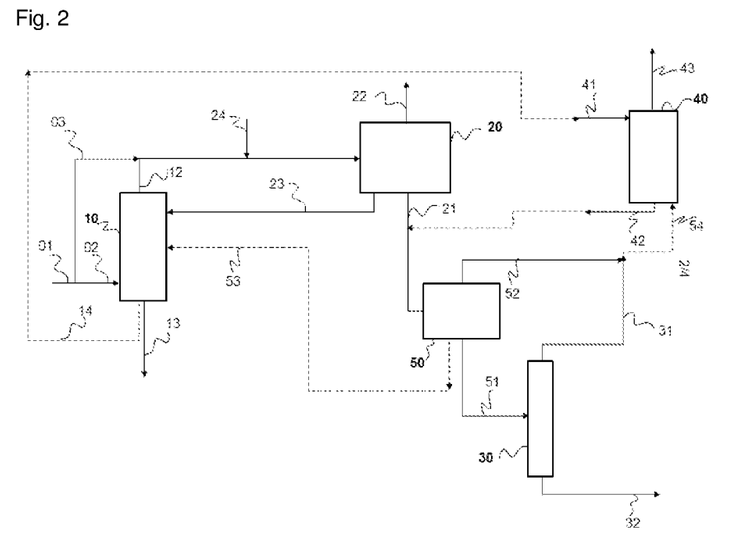
FIG. 2 illustrates the implementation of the process according to a second embodiment of the invention.

FIG. 2 illustrates the implementation of the process according to a second embodiment of the invention, in which an additional separator is implemented compared to the embodiment of the invention according to FIG. 1.

In contrast to the embodiment of FIG. 1, the liquid stream of hydrocarbons 21 which comprises methanol is sent to a separation step (h) carried out in a separating drum 50.

In a first variant, the separating drum 50 is a two-phase drum. This drum makes it possible to separate:
- a gaseous stream 52 which comprises methanol and is subsequently mixed with the gaseous fraction 31 obtained from the stabilization column 30;
- a second liquid hydrocarbon stream 51 which is then sent to the stabilization step carried out in the stabilization column 30.

As in the embodiment described in FIG. 1, the gaseous stream 54 obtained from the mixing of the gaseous fraction obtained from the stabilization step 31 with the gaseous stream 52 obtained from the separator 50 can be used for example as fuel gas or can be compressed in order to be recycled upstream of the gasoline extraction step.

In another variant of the process according to the invention, the gaseous stream 54 is sent to a step f of washing with water which is carried out in a liquid-liquid column 40 with the aid of an aqueous stream 41. This step of washing the stream 54 thus makes it possible to produce a stream 43 rich in compounds having 1 to 4 carbon atoms but depleted in methanol compared to the stream 54.

In a variant, the water stream 42 enriched in methanol in comparison to the aqueous stream 41, obtained from the washing column 40, can be sent directly to the contacting step 10 in order to be regenerated by transferring the methanol into the fraction of natural gas to be treated 02.

In an alternative variant, the water stream comprising methanol 42 obtained from the washing column 40 can be mixed with the liquid hydrocarbon stream 21 obtained from the gasoline extraction 20. This mixing is effected preferentially with an injection nozzle or an on-line static mixer (not shown). The stream obtained is sent to the separator 50, which is in that case a three-phase separator.

In this variant, the separating drum 50 makes it possible to separate:
- a gaseous phase 52, which is subsequently mixed with the gaseous phase 31 obtained from the stabilization column 30. Said gaseous fraction comprises a residual content of methanol;
- an aqueous phase comprising methanol 53;
- a liquid hydrocarbon phase 51 which is then sent to the stabilization step carried out in the stabilization column 30.

In this variant, the content of methanol in the aqueous phase comprising methanol is higher than the content of methanol in the water stream comprising methanol 42 obtained from the washing column 40.

Preferably, said aqueous phase comprising methanol 53 is sent to the contacting step in such a manner as to transfer the methanol it contains into the stream of natural gas to be treated 02. Then, the aqueous phase depleted in methanol obtained is either purged via the conduit 13, or recycled to the washing step via the conduit 41. With this variant, this embodiment makes it possible to recover in the aqueous phase comprising methanol 53 an amount of methanol greater than that recovered in the aqueous phase 44; it thus limits the losses of methanol in the process.

Figure 3:
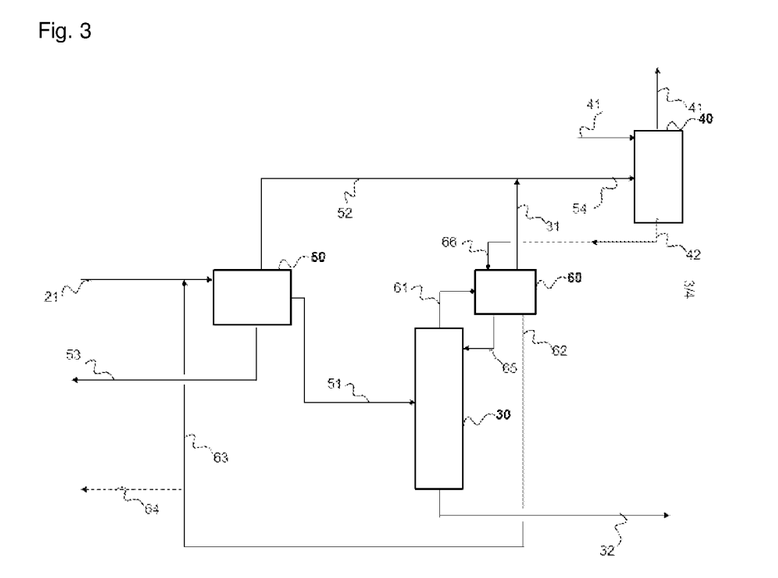
FIG. 3 illustrates the implementation of the process according to a third variant of the process according to the invention.

FIG. 3 illustrates the implementation of the process according to a third embodiment of the invention, according to which an additional washing step is carried out in the reflux drum 60 of the stabilization column compared to the embodiment of the invention according to FIG. 2.

In this embodiment, the stabilization column 30 comprises a reboiling zone (not shown) and a condensation zone, the latter of which may in particular comprise a reflux drum 60. Said reflux drum receives the vapour 61 obtained from the stabilization column, after cooling in an air condenser or in a cooling water exchanger. The vapour 61 comprises methanol.

In this embodiment, the vapour 61 obtained from the stabilization column receives a stream of washing water 66, preferentially after having been cooled. The aqueous phase is preferentially injected with the aid of a dispersing nozzle (not shown). In this embodiment, said reflux drum makes it possible to separate:
- a hydrocarbon stream 65, which is returned to the stabilization column as reflux;
- a gaseous C1-C4-rich stream comprising methanol which is depleted in methanol in comparison to the vapour 61;
- an aqueous stream comprising methanol 62.

The aqueous stream comprising methanol 62 can be sent directly to the contacting step 10 via the conduit 64, or can be mixed with the hydrocarbon-based stream 21 separated in step 50.

In a variant of this embodiment, the gaseous fraction 31 is mixed with the stream 52 obtained from step 50 in order to form the stream 54 which is sent to a step f of washing with water which is carried out in a liquid-liquid column 40 with the aid of an aqueous stream 41 having a low content of methanol.

This step of washing the stream 54 thus makes it possible to produce a stream 43 rich in compounds having 1 to 4 carbon atoms but depleted in methanol compared to the stream 54.

In this variant, the water stream comprising methanol 42 obtained from the washing column 40 can then be used as washing water at the inlet of the reflux drum via the conduit 66.

In this case, the content of methanol in the aqueous phase comprising methanol 62 is higher than the content of methanol in the water stream comprising methanol 42 and obtained from the washing column 40. Likewise, the content of methanol in the aqueous phase comprising methanol 53 is higher than the content of methanol in the water stream comprising methanol 62.

This embodiment, in particular when it implements a step of washing and two steps of mixing and separation, makes it possible to recover in the aqueous phase comprising methanol 53 an amount of methanol greater than that recovered in the embodiment of FIG. 1. This makes it possible to limit the losses of methanol in the process.

Figure 4:
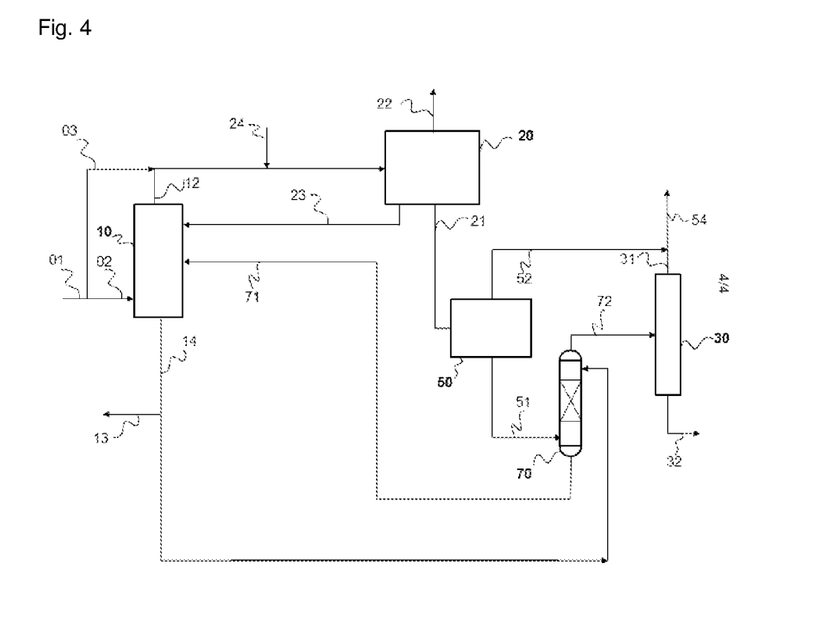
FIG. 4 illustrates the implementation of the process according to a fourth version of the invention.

FIG. 4 illustrates a process according to a fourth variant of the process according to the invention: compared to the process according to FIG. 1, the stream of hydrocarbons 21 obtained from the gasoline extraction step 20 is separated into a stream of hydrocarbon vapour 52 and into a stream of liquid hydrocarbons 51 in a separator 50. The stream of liquid hydrocarbons 51 is contacted in countercurrent through a liquid-liquid washing column 70 with washing water originating from the contacting step to produce spent washing water 71 containing 9.4% by weight of methanol and washed liquid hydrocarbons 72. The washed liquid hydrocarbons 72 are sent to a distillation column 30 with reboiling section and reflux section to produce stabilized condensates (stream 32) and a stabilization gas 31 which, once mixed with the hydrocarbon vapours 52 obtained from the separation of stream 21, forms the stream 54.

With the configuration of FIG. 4, it is possible to effectively withdraw the methanol from the liquid hydrocarbon phase before stabilization.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 2000325, filed Jan. 14, 2020 are incorporated by reference herein.

EXAMPLES

In all of the examples, water-saturated natural gas 01 is considered, which has a flow rate of 15 000 kmol/h (dry basis), a pressure of 8.1 MPa, a temperature of 40° C. and a composition (main streams) which is given in Table 1 below. Approximately 65% of the gas to be treated via the conduit 02 feeds a step of contacting in a stripping column 10 and then is mixed again with the other portion of the gas to be treated via the conduit 03 to generate a stream. This stream receives a supplement of methanol via the stream 24 and then feeds a gasoline extraction step 20 comprising a three-phase separation step. The stripping step produces purge water 13 and washing water 14 containing 400 ppm by weight of methanol. The flow rate of the conduit 02 is adjusted slightly according to the examples in order to satisfy this water quality.

The gasoline extraction step followed by the separation step make it possible to partially condense and to separate the gas to be treated at 4.4 MPa and −39.5° C., to produce:

a stream 22 of treated natural gas of 14 344 kmol/h at 4.35 MPa and 34° C., a stream 23 of water comprising methanol of 1 140 kg/h and containing 75% by weight of methanol;

and a stream 21 of hydrocarbons comprising methanol of 661 kmol/h in the two-phase state at 1.7 MPa and 12.5° C., with a molar vapour fraction of 0.446.

TABLE 1

| stream reference | 01 | 22 | 21 | 21 (vapour fraction) | 21 (liquid fraction) |
|---|---|---|---|---|---|
| molar flow rate (kmol/h) | 15 018 | 14 344 | 661 | 295 | 366 |
| molar vapour fraction | 1.000 | 1.000 | 0.446 | 1.000 | 0.000 |
| mol % of C1-C4 compounds | 96.55 | 97.55 | 76.94 | 94.48 | 62.81 |
| mol % of C5+ compounds | 0.93 | 0.06 | 19.84 | 0.88 | 35.11 |
| mol % of other compounds ($N_2$, $CO_2$) | 2.4 | 2.4 | 2.64 | 4.46 | 1.18 |
| mol % of methanol | 0.00 | 0.01 | 0.57 | 0.17 | 0.90 |
| methanol mass flow rate (kg/h) | 0.0 | 32.7 | 121.4 | 16.2 | 105.2 |

Example 1

Example 1 is carried out according to the process described in FIG. 1. The stream 21 of hydrocarbons comprising methanol is sent directly to a distillation column 30. The column 30 has a reboiling section and a reflux section. It produces a stream 32 of liquid hydrocarbons composed of C5+compounds (stabilized condensates) and a vapour stream 31 at a pressure of 1.0 MPa and a temperature of 24° C., the properties of which are presented in Table 2 below.

TABLE 2

| stream reference | 21 | 32 | 31 |
|---|---|---|---|
| molar flow rate (kmol/h) | 661 | 137 | 524 |
| molar vapour fraction | 0.446 | 0.000 | 1.000 |
| mol % of C1-C4 compounds | 76.94 | 9.47 | 94.54 |
| mol % of C5+ compounds | 19.84 | 90.53 | 1.40 |
| mol % of other compounds ($N_2$, $CO_2$) | 2.64 | 0.00 | 3.33 |
| mol % of methanol | 0.57 | 0.00 | 0.72 |
| methanol mass flow rate (kg/h) | 121.4 | 0.0 | 121.4 |

The stabilization column 30 thus makes it possible to produce:

a C1-C4-rich gaseous stream 31 comprising methanol. This stream has a content of 94.5 mol % of C1-C4 compounds and 0.723% of methanol (i.e. 121.4 kg/h);

and a stream 32 of liquid hydrocarbons composed of C5+compounds (stabilized condensates) almost devoid of methanol (0.0 kg/h). This stream specifically contains less than 10 ppm by weight of methanol.

The entirety of the methanol contained in the stream 21 is contained in the gaseous stream 31 produced by the stabilization column 30.

Optionally, the C1-C4-rich gaseous stream 31 comprising methanol is washed with water in countercurrent through a gas-liquid washing column 40 with 1000 kg/h of washing water 41 containing approximately 400 ppm by weight of methanol. This water stream preferably originates from the contacting step 10. The properties of the streams 31 and 43 are presented in Table 3 below.

TABLE 3

| stream reference | 31 | 43 |
|---|---|---|
| molar flow rate (kmol/h) | 524 | 522 |
| molar vapour fraction | 1.000 | 1.000 |
| mol % of C1-C4 compounds | 94.54 | 94.84 |
| mol % of C5+ compounds | 1.40 | 1.41 |
| mol % of other compounds ($N_2$, $CO_2$) | 3.33 | 3.34 |
| mol % of methanol | 0.72 | 0.014 |
| methanol mass flow rate (kg/h) | 121.4 | 2.3 |

This washing column makes it possible to produce:

spent washing water 42 containing 11.0% by weight of methanol (119.5 kg/h);

and a washed gaseous stream 43. This stream is rich in C1-C4 compounds (94.84 mol %) and depleted in methanol. Its residual content of methanol is 135 molar ppm.

With the use of the washing column, the recovery rate of the methanol initially contained in the stream 31 (corresponding to the entirety of the methanol contained in the stream 21) is 98.1%.

In order to recover this methanol in the gasoline extraction process, the spent washing water 42 is preferably sent to the contacting step 10 in order to transfer the methanol into the stream of natural gas to be treated 02 and to produce a stream 13 of clean washing water, a portion 14 of which may be used for the washing water 41 of the washing column 40.

In this case, the use of the washing column on the stream 31 makes it possible to recover 119.1 kg/h of methanol, which makes it possible to avoid supplementing the corresponding amount.

Example 2

Example 2 is carried out in accordance with a process according to the second embodiment of the invention, as described in FIG. 2.

The stream 21 of hydrocarbons comprising methanol originating from the gasoline extraction step is first sent to a separator 50, which produces:

on the one hand, a stream 51 of liquid hydrocarbons;

and on the other hand, a gaseous stream 52.

The properties of these streams are presented in Table 4 below.

The stream 51 of liquid hydrocarbons is sent to a stabilization column 30. This column has a reboiling section and a reflux section. It produces a stream 32 of liquid hydrocarbons composed of C5+compounds (stabilized condensates) and a C1-C4-rich vapour stream 31 comprising methanol, which is mixed with the gaseous stream 52 originating from the separator 50 to give a gaseous stream 54 at 0.8 MPa and 24.2° C.

TABLE 4

| stream reference | 21 | 51 | 52 | 32 | 31 | 54 |
|---|---|---|---|---|---|---|
| molar flow rate (kmol/h) | 661 | 366 | 295 | 137 | 229 | 524 |
| molar vapour fraction | 0.446 | 0.000 | 1.000 | 0.000 | 1.000 | 1.000 |
| mol % of C1-C4 compounds | 76.94 | 62.82 | 94.48 | 9.42 | 94.62 | 94.54 |
| mol % of C5+ compounds | 19.84 | 35.11 | 0.88 | 90.58 | 2.07 | 1.40 |
| mol % of other compounds ($N_2$, $CO_2$) | 2.64 | 1.18 | 4.46 | 0.00 | 1.88 | 3.33 |
| mol % of methanol | 0.57 | 0.897 | 0.172 | 0.00 | 1.43 | 0.723 |
| methanol mass flow rate (kg/h) | 121.4 | 105.2 | 16.2 | 0.0 | 105.2 | 121.4 |

As in Example 1, the stabilization column 30 thus makes it possible to produce:

a C1-C4-rich gaseous stream 31 comprising methanol. This stream comprises, specifically, 94.6 mol % of C1-C4 compounds and 1.43 mol % of methanol (i.e. 105.2 kg/h);

and a stream 32 of liquid hydrocarbons composed of C5+compounds (stabilized condensates) almost devoid of methanol (0.0 kg/h). This stream specifically contains less than 10 ppm by weight of methanol.

The entirety of the methanol contained in the stream 51 is contained in the gaseous stream 31 produced by the stabilization column 30.

The C1-C4-rich gaseous stream 54 comprising methanol is contacted in countercurrent through a gas-liquid washing column 40 with 1000 kg/h of washing water 41 containing approximately 400 ppm by weight of methanol. The properties of the streams 54 and 43 are indicated in Table 5 below:

TABLE 5

| stream reference | 54 | 43 |
|---|---|---|
| molar flow rate (kmol/h) | 524 | 523 |
| molar vapour fraction | 1.000 | 1.000 |

TABLE 5-continued

| stream reference | 54 | 43 |
|---|---|---|
| mol % of C1-C4 compounds | 94.54 | 94.76 |
| mol % of C5+ compounds | 1.40 | 1.40 |
| mol % of other compounds (N$_2$, CO$_2$) | 3.33 | 3.34 |
| mol % of methanol | 0.723 | 0.022 |
| methanol mass flow rate (kg/h) | 121.4 | 3.7 |

This washing column makes it possible to produce:
spent washing water 42 containing 11.0% by weight of methanol;
and a washed gaseous stream 43. This stream is rich in C1-C4 compounds (94.8 mol %) and depleted in methanol. Its residual content of methanol is 219 molar ppm.

In order to recover this methanol in the gasoline extraction process, the spent washing water 42 is sent to the stripping step 10 in order to transfer the methanol into the stream of natural gas to be treated 02 and to produce a stream 13 of clean washing water, a portion 14 of which is used for the washing water 41 of the washing column 40.

With the use of the washing column, the recovery rate of the methanol initially contained in the stream 31 (corresponding to the entirety of the methanol contained in the stream 21) is 97.0%.

Example 3

Example 3 is carried out in accordance with a process similar to that of Example 2 but with an additional intermediate washing step concomitant with the separation step 50 before the stabilization column 30, as described in FIG. 2 (broken lines).

The stream 42 composed of water comprising methanol at 5.0% by weight of methanol which originates from the washing column 40 is mixed with the stream 21 upstream of the separator 50. The three-phase mixture obtained is then separated into:
a stream 52 of hydrocarbon vapours containing 0.08 mol % of methanol with a flow rate of 297 kmol/h;
a stream 53 of water comprising methanol at 11.1% by weight of methanol;
and a stream 51 of liquid hydrocarbons not containing more than 0.38% of methanol with a flow rate of 362 kmol/h.

The stream 51 of liquid hydrocarbons is sent to the distillation column 30 with reboiling section and reflux section to produce:
a C1-C4-rich gaseous stream 31 comprising methanol. This stream comprises, specifically, 95.4 mol % of C1-C4 compounds and 0.61% of methanol (i.e. 44.5 kg/h);
and a stream 32 of liquid hydrocarbons composed of C5+compounds (stabilized condensates) almost devoid of methanol (0.0 kg/h). This stream specifically contains less than 10 ppm by weight of methanol.

The gaseous stream 54 obtained after mixing stream 52 and stream 31 is contacted in countercurrent through a gas-liquid washing column 40 with 1000 kg/h of washing water containing approximately 400 ppm by weight of methanol (stream 41) to produce:
a stream of spent washing water 42 containing 5.0% by weight of methanol;
and a stream of washed natural gas 43 containing 96 molar ppm of methanol.

The properties of these streams are presented in Table 6 below:

TABLE 6

| stream reference | 21 | 32 | 54 | 43 |
|---|---|---|---|---|
| molar flow rate (kmol/h) | 661 | 137 | 522 | 523 |
| vapour fraction (molar basis) | 0.446 | 0.000 | 1.000 | 1.000 |
| mol % of C1-C4 compounds | 76.94 | 9.42 | 94.86 | 94.81 |
| mol % of C5+ compounds | 19.84 | 90.58 | 1.41 | 1.41 |
| mol % of other compounds (N$_2$, CO$_2$) | 2.64 | 0.00 | 3.34 | 3.33 |
| mol % of methanol | 0.57 | 0.00 | 0.311 | 0.010 |
| methanol mass flow rate (kg/h) | 121.4 | 0.0 | 52.0 | 1.6 |

In order to recover the methanol in the gasoline extraction process, the spent washing water 53 is sent to the contacting step 10 in order to transfer the methanol into the stream of natural gas to be treated 02 and to produce a stream 13 of clean washing water, a portion 14 of which is used for the washing water 41 of the washing column 40. In this implementation of the invention, the recovery rate of the methanol initially contained in the stream 21 is (121.4-1.6)/121.4=98.7% by weight.

In this case, 119.8 kg/h of methanol are recovered, which makes it possible to avoid supplementing the corresponding amount of methanol.

Example 4

Example 4 is carried out according to the fourth embodiment of the invention, as described in FIG. 4, in which the stream of hydrocarbons 21 obtained from the gasoline extraction step 20 is separated into a stream of hydrocarbon vapour 52 and a stream of liquid hydrocarbons 51. The stream of liquid hydrocarbons 51 is contacted in countercurrent through a liquid-liquid washing column 70 with 1000 kg/h of washing water 14 originating from the contacting step and containing approximately 400 ppm by weight of methanol to produce spent washing water 71 containing 9.4% by weight of methanol and washed liquid hydrocarbons 72 containing 87 ppm by weight of methanol.

The washed liquid hydrocarbons 72 are sent to a distillation column 30 with reboiling section and reflux section to produce stabilized condensates (stream 32) and a stabilization gas 31 which, once mixed with the hydrocarbon vapours 52 obtained from the separation of the stream 21, forms the stream 54 at 0.8 MPa and 24.2° C.

The recovery rate of the methanol initially contained in the stream 21 is in this process 85.1%.

The properties of the streams 21, 32 and 54 are indicated in Table 7 below:

TABLE 7

| stream reference | 21 | 32 | 54 |
|---|---|---|---|
| molar flow rate (kmol/h) | 661 | 137 | 521 |
| vapour fraction (molar basis) | 0.446 | 0.000 | 1.000 |
| mol % of C1-C4 compounds | 76.94 | 9.40 | 95.12 |
| mol % of C5+ compounds | 19.84 | 90.60 | 1.39 |
| mol % of other compounds (N$_2$, CO$_2$) | 2.64 | 0.00 | 3.35 |
| mol % of methanol | 0.57 | 0.00 | 0.11 |
| methanol mass flow rate (kg/h) | 121.4 | 0.0 | 18.1 |

In this case, the use of the liquid-liquid washing column on the stream 71 makes it possible to recover 103.3 kg/h of methanol, which makes it possible to avoid supplementing the corresponding amount of methanol.

Example 5

The example is carried out in accordance with a process similar to that of Example 3 but with an additional washing step at the reflux drum 60 of the stabilization column 30, as described in FIG. 3.

The stream 62 composed of water and of 5.1% by weight of methanol, which originates from the reflux drum 60, is mixed with the stream 21 upstream of the separator 50. The three-phase mixture obtained is then separated into:
- a stream 52 of hydrocarbon vapours containing 0.08% of methanol with a flow rate of 298 kmol/h;
- a stream 53 of water comprising methanol at 11.2% by weight of methanol;
- and a stream 51 of liquid hydrocarbons not containing more than 0.39% of methanol with a flow rate of 361 kmol/h.

The stream 42 composed of water and of 2.9% by weight of methanol, which originates from the washing column 40, is mixed with the stream 61 which originates from the top of the stabilization column 30 upstream of the reflux drum 60. The three-phase mixture obtained is then separated into:
- a stream 31 of hydrocarbon vapours containing 0.32% of methanol with a flow rate of 226 kmol/h;
- a stream 62 of water comprising methanol at 5.1% by weight of methanol;
- and a stream 65 of liquid hydrocarbons not containing more than 0.24% of methanol with a flow rate of 112 kmol/h.

The stream 51 of liquid hydrocarbons is sent to the distillation column 30 with reboiling section to produce:
- a C1-C4-rich gaseous stream 61 comprising methanol and with a flow rate of 336 kmol/h which is sent to the reflux section 60 of the distillation column 30. This stream comprises, specifically, 93.28 mol % of C1-C4 compounds and 0.50% of methanol (i.e. 53.8 kg/h);
- and a stream 32 of liquid hydrocarbons composed of C5+compounds (stabilized condensates) almost devoid of methanol (0.0 kg/h). This stream specifically contains less than 10 ppm by weight of methanol.

The gaseous stream 54 obtained after mixing stream 52 and stream 31 is contacted in countercurrent through a gas-liquid washing column 40 with 1000 kg/h of washing water containing approximately 400 ppm by weight of methanol (stream 41) to produce:
- a stream of spent washing water 42 containing 2.9% by weight of methanol;
- and a stream of washed natural gas 43 containing 82 molar ppm of methanol.

The properties of the streams 21, 32, 54 and 43 are indicated in Table 8 below:

TABLE 8

| stream reference | 21 | 32 | 54 | 43 |
|---|---|---|---|---|
| molar flow rate (kmol/h) | 661 | 137 | 524 | 523 |
| vapour fraction (molar basis) | 0.446 | 0.000 | 1.000 | 1.000 |
| mol % of C1-C4 compounds | 76.94 | 9.47 | 94.58 | 94.71 |
| mol % of C5+ compounds | 19.84 | 90.53 | 1.47 | 1.47 |
| mol % of other compounds (N2, CO2) | 2.64 | 0.00 | 3.33 | 3.33 |

TABLE 8-continued

| stream reference | 21 | 32 | 54 | 43 |
|---|---|---|---|---|
| mol % of methanol | 0.57 | 0.00 | 0.18 | 0.008 |
| methanol mass flow rate (kg/h) | 121.4 | 0.0 | 31.0 | 1.4 |

In order to recover the methanol in the gasoline extraction process, the spent washing water 53 is sent to the contacting step 10 in order to transfer the methanol into the stream of natural gas to be treated 02 and to produce a stream 13 of clean washing water, a portion 14 of which can be used for the washing water 41 of the washing column 40.

With this implementation of the invention, the recovery rate of the methanol initially contained in the stream 21 is (121.4-1.4)/121.4=98.9% by weight. 120 kg/h of methanol are recovered, which makes it possible to avoid supplementing the corresponding amount of methanol.

With this example, a maximal recovery rate of methanol which approaches 99% is thus obtained.

In conclusion, this series of examples demonstrates that with the invention it is possible on the one hand to obtain a liquid phase of condensed hydrocarbons (stabilized condensates) of C5+type without methanol and highly profitably exploitable and that, on the other hand, by carrying out one or more optional steps of recovering methanol, it is possible to maximize the recovery of the methanol required for the gasoline extraction, with a recovery rate which is at least 85%, indeed even at least 97%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A process for extracting gasoline from a gas G containing condensable hydrocarbons, said process comprising:
  (a) refrigeration of a gas comprising methanol GM obtained from (d), producing a partially condensed fluid GL1;
  (b) separating said partially condensed fluid GL1, carried out in a three-phase separator, producing
    a first aqueous liquid phase A1 comprising methanol,
    a first liquid phase H1 of hydrocarbon(s) comprising methanol, and
    a gaseous phase G1;
  (c) first contacting a first portion of the gas G with said first aqueous liquid phase A1 comprising methanol, producing
    a second aqueous liquid phase A2 comprising methanol and depleted in methanol compared to said first aqueous liquid phase A1,
    a gaseous phase of gas to be treated comprising methanol GM';
  (d) mixing said gaseous phase of gas to be treated comprising methanol GM' with a second portion of the gas G, with optional adjustment of the methanol content of the mixture, producing a gas to be treated comprising methanol GM which is intended to be sent to a);
  (e) stabilizing all or part of said first liquid phase H1 of hydrocarbon(s) comprising methanol, producing a sta- bilized condensate GL2 and a C1-C4-rich gaseous phase G2 comprising methanol.

2. The process according to claim 1, wherein (a) extracting gasoline by refrigeration of the gas to be treated is carried out in a refrigeration section operating at a temperature of −60° C. to 0° C. and at a pressure of 1.2 MPa to 6.0 MPa.

3. The process according to claim 1, wherein stabilization (e) is carried out in a stabilization/distillation column, producing at the bottom the stabilized condensate GL2 and at the top the $C_1$-$C_4$-rich gaseous phase G2 comprising methanol.

4. The process according to claim 1, wherein treatment of the C1-C4-rich gaseous phase G2 comprising methanol and obtained in stabilization (e) comprises:
(f) washing, with water, said C1-C4-rich gaseous phase G2 comprising methanol with the aid of a third aqueous liquid phase A3, carried out by gas-liquid contacting, producing
a second C1-C4-rich gaseous phase G3 with a reduced content of methanol, and
a fourth aqueous phase A4 enriched in methanol in comparison to said third aqueous liquid phase A3;
(g) a second contacting a portion of the gas G with said fourth aqueous phase A4 enriched in methanol, carried out in at least one stripper, producing
a fifth aqueous phase A5 depleted in methanol compared to said fourth aqueous phase A4 enriched in methanol, and
a second phase of gas to be treated comprising methanol GM″, which is mixed with the phase of gas to be treated comprising methanol GM′ obtained from (c).

5. The process according to claim 1, wherein, in (f), all or part of the third aqueous liquid phase A3 originates the third liquid phase A3 comprising all or part of the second aqueous liquid phase A2 obtained in (c) and/or all or part of the fifth aqueous phase A5 obtained in (g).

6. The process according to claim 4, wherein the second C1-C4-rich gaseous phase G3 with a reduced content of methanol obtained from step (f) is profitably exploited directly, either as low-pressure combustible gas or as high-pressure combustible gas after compression, alone or after mixing with another gas.

7. The process according to claim 1, wherein the first contacting in (c), and possibly optionally the second contacting in (g), is carried out in at least one stripper-type contacting column or by pervaporation through a membrane which is selective with respect to methanol.

8. The process according to claim 1, wherein the C1-C4-rich gaseous phase G2 comprising methanol and obtained from step (e) is profitably exploited directly, either as low-pressure combustible gas or as high-pressure combustible gas after compression, alone or after mixing with another gas.

9. The process according to claim 1, additionally comprising:
(h) separating the first liquid phase H1 of hydrocarbon(s) obtained from (b), to produce
a second liquid phase H2 of hydrocarbon(s) comprising methanol, which is sent to stabilization (e), and
a third gaseous phase G4 comprising C1-C4 compounds and methanol.

10. The process according to claim 1, wherein the third gaseous phase G4 comprising C1-C4 compounds and methanol is sent to washing (f) of washing with water, as a mixture with the C1-C4-rich gaseous phase G2 comprising methanol and obtained from stabilization (e).

11. The process according to claim 1, additionally comprising:
(j) mixing the first liquid phase H1 of hydrocarbon(s) comprising methanol and obtained from (b) with an eighth aqueous phase A8, which comprises all or part of the second aqueous phase A2 obtained from (c);
(h') separating the mixture obtained from (j), to produce:
a fourth liquid phase H4 of hydrocarbon(s) comprising methanol which is sent to stabilization (e);
a fourth gaseous phase G5 comprising C1-C4 compounds and methanol;
a ninth aqueous phase A9 enriched in methanol compared to the eighth aqueous phase A8.

12. The process according to claim 11, additionally comprising:
(j) mixing the first liquid phase H1 of hydrocarbon(s) comprising methanol and obtained from (b) with an eighth aqueous phase A8, which comprises all or part of the second aqueous phase A2 obtained from (c) and/or all or part of the fourth aqueous phase A4 comprising methanol and obtained from (f);
(h') separating the mixture obtained from (j) to produce:
a fourth liquid phase H4 of hydrocarbon(s) comprising methanol which is sent to stabilization (e);
a fourth gaseous phase G5 comprising C1-C4 compounds and methanol;
a ninth aqueous phase A9 enriched in methanol compared to the eighth aqueous phase A8.

13. The process according to claim 11, wherein the fourth gaseous phase G5 comprising C1-C4 compounds and methanol is sent to (f) washing with water, as a mixture with the C1-C4-rich gaseous phase G2 comprising methanol and obtained from stabilization (e).

14. The process according to claim 11, additionally comprising:
(k) contacting a portion of the gas G with the seventh aqueous phase A7 and/or the ninth aqueous phase A9, to produce
a tenth aqueous phase A10 and/or an eleventh aqueous phase A11 depleted in methanol in comparison with the seventh aqueous phase A7 and/or the ninth aqueous phase A9, and
a second phase of gas G' comprising methanol.

15. The process according to claim 4,
wherein the third aqueous liquid phase A3 used in washing in (f) is composed in part or completely of the second aqueous phase A2 depleted in methanol and/or of the tenth aqueous phase A10 depleted in methanol and/or of the eleventh aqueous phase A11 depleted in methanol.

16. The process according to claim 1, wherein the gas G containing condensable hydrocarbons is natural gas containing C5+compounds.

* * * * *